(12) United States Patent
Higuchi

(10) Patent No.: US 6,259,236 B1
(45) Date of Patent: Jul. 10, 2001

(54) CHOPPER TYPE SWITCHING POWER SUPPLY

(75) Inventor: Yoshio Higuchi, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/640,675

(22) Filed: Aug. 18, 2000

(30) Foreign Application Priority Data

Aug. 24, 1999 (JP) .................................................. 11-236376

(51) Int. Cl.[7] ...................................................... G05F 1/10
(52) U.S. Cl. ............................................. 323/222; 363/124
(58) Field of Search ..................................... 323/222, 223, 323/226, 273, 282, 285; 363/20, 21.01, 18, 19, 124

(56) References Cited

U.S. PATENT DOCUMENTS

| | | | |
|---|---|---|---|
| 3,974,439 | * 8/1976 | Holland | 323/222 |
| 4,238,710 | * 12/1980 | Nelson | 315/307 |
| 5,408,203 | * 4/1995 | Okano et al. | 331/143 |
| 5,565,762 | * 10/1996 | Ishikawa et al. | 323/222 |
| B1 6,178,104 | * 1/2001 | Choi | 363/89 |

FOREIGN PATENT DOCUMENTS 62-48259   3/1987   (JP) .

* cited by examiner

Primary Examiner—Matthew Nguyen
(74) Attorney, Agent, or Firm—Crowell & Moring, L.L.P.

(57) ABSTRACT

An oscillation circuit 1 for controlling the on/off operation of a main switching element 5 is arranged to include a first inductor L1 coupled at its one terminal to a DC power supply, an oscillation switching element Q2 for opening and closing the connection between the ground level and the other terminal of the first inductor L1, a second inductor L2, inductively coupled to the first inductor L1, for generating a feedback output for turning on the oscillation switching element Q2 when the oscillation switching element Q2 is turned on, and a voltage stabilizing circuit 2 for detecting an error voltage of a DC output 22 and, when the error voltage thus detected represents increase of a voltage of the DC output 22, for reducing a level of the feedback output induced to the oscillation switching element Q2 in correspondence to an amount of the increased voltage.

3 Claims, 4 Drawing Sheets

CHOPPER TYPE SWITCHING POWER SUPPLY

BACKGROUND OF THE INVENTION

The present invention relates to a chopper type switching power supply for boosting input voltage and, more particularly, to a chopper type switching power supply in which an oscillation circuit for controlling the on/off operation of a switching element is formed by an oscillation circuit which performs the oscillating operation by using a pair of inductors coupled to each other.

As one of the chopper type switching power supplies capable of obtaining boosted DC output by using a simple circuit arrangement, there is a self-excited chopper type switching power supply in which a switching element forms a part of an oscillation circuit, as shown in the block 2 of FIG. 2 of JP-A-62-48259. However, when obtaining the DC output exceeding 10 W, for example, by using the self-excited chopper type switching power supply, such a problem is apt to occur that the oscillating operation stops when the load changes. In contrast, when the constants of elements are set so that the oscillating operation stops scarcely, the conversion efficiency is likely reduced. Thus, when obtaining the DC output of relatively large electric power such as 10 W etc., a separately excited type arrangement is employed in which an oscillation circuit is provided separately from the switching circuit and the on/off operation of the switching element is controlled by the output of the oscillation circuit.

FIG. 4 shows the aforesaid chopper type switching power supply. That is, the chopper type switching power supply is provided with a triangular wave generation circuit 72 for generating a rectangular waveform signal and a comparator 71 having one terminal to which the rectangular waveform signal generated by the triangular wave generation circuit 72 is applied and the other terminal to which divided voltage of a DC output 73 is applied. Further, the chopper type switching power supply is arranged to perform the on/off control of a transistor 74 serving as a switching element by using the output of the comparator 71.

However, the following problem arises when the aforesaid arrangement is employed. That is, the chopper type switching power supply changes a ratio between a time period where the transistor 74 is in an ON state and a time period where the transistor is in an OFF state thereby to control the DC output 73 to a predetermined voltage. Further, the period where the transistor 74 is turned on is same as the period of the triangular waveform signal generated by the triangular wave generation circuit 72. Thus, the smaller the load is, the smaller the ratio of the time where the transistor 74 is in an ON state becomes. Accordingly, when the load becomes almost 0, the time period where the transistor 74 is in an ON state becomes quite short. As a result, there arises a phenomenon that the transistor 74 is turned off on the way where the transistor moves to the saturation state of ON state. Thus, there arises a problem that, when the load becomes smaller, the loss of the transistor 74 increases and hence the conversion efficiency is reduced.

SUMMARY OF THE INVENTION

Accordingly, the invention has been made in order to solve the aforesaid problem of the prior art, and an object of the invention is to provide a chopper type switching power supply which can prevent the reduction of the conversion efficiency even when the load becomes smaller in a manner that the on/off operation of a boosting switching element is controlled by using the output of an oscillation circuit for intermittent oscillation when the load becomes smaller.

In addition to the aforesaid object, another object of the invention is to provide a chopper type switching power supply which can employ an element with a low withstand voltage as a switching element for oscillation in a manner that current generated in an inductor when the switching element for oscillation is turned off is flown in a DC output through a diode thereby to suppress the increase of the voltage generated in the inductor.

In addition to the aforesaid object, still another object of the invention is to provide a chopper type switching power supply which can increase the conversion efficiency at the intermittent oscillation by applying the oscillation output to the gate of an FET through a PNP transistor.

In order to attain the aforesaid object, the chopper type switching power supply according to the invention is applied to the chopper type switching power supply in which a main switching element whose on/off operation is controlled by an output of an oscillation circuit opens and closes a connection between a ground level and other terminal of a main inductor whose one terminal is coupled to a DC power supply, and a DC output is taken out by using a rectifying and smoothing circuit coupled to the other terminal of the main inductor, the oscillation circuit is arranged to include

- a first inductor coupled at its one terminal to the DC power supply;
- an oscillation switching element for opening and closing a connection between the ground level and other terminal of the first inductor;
- a second inductor, inductively coupled to the first inductor, for generating a feedback output for turning on the oscillation switching element when the oscillation switching element is turned on; and
- a voltage stabilizing circuit for detecting an error voltage of a DC output outputted from the rectifying and smoothing circuit and, when the error voltage thus detected represents increase of a voltage of the DC output, for reducing a level of the feedback output induced to the oscillation switching element in correspondence to an amount of the increased voltage.

That is, when the load becomes small, the voltage of the DC output increases. Thus, the voltage stabilizing circuit reduces the level of the feedback output induced to the oscillation switching element and finally makes the level of the feedback output induced to the oscillation switching element zero. When such a phenomenon occurs, since the oscillation switching element can not be turned on, the oscillating operation stops. During the period where the oscillating operation stops, the voltage of the DC output decreases, and when a part of the feedback output outputted from the second inductor is induced to the oscillation switching element, the oscillating operation starts again. In this manner, the intermittent oscillating operation is performed. During the oscillation period of the intermittent oscillation, the electric power dissipated both in the oscillation period and the non-oscillation period is generated. In other words, the electric power generated during the oscillation period becomes large. Thus, the time period during which the oscillation switching element is in an ON state becomes sufficient time period. Therefore, the ratio of the transient time period during which the main switching element shifts from an ON state to an OFF state and vice versa with respect to the time period during which the main switching element is in the saturated ON state is a small value. This means that the switching loss of the main switching element scarcely increases despite that the load becomes small.

In addition to the aforesaid arrangement, the chopper type switching power supply is arranged to further include the clamping diode having the one terminal coupled to the other terminal of the first inductor and the other terminal coupled to the current path of an arbitrary DC output, wherein the clamping diode is arranged to such a direction that the clamping diode flows current therethrough when the oscillation switching element is turned off.

That is, when the oscillation switching element is turned off, the current generated at the other terminal of the first inductor flows into the DC output through the clamping diode. Thus, the voltage at the other terminal of the first inductor is suppressed to the voltage near the voltage of the DC output.

In addition to the aforesaid arrangement, the chopper type switching power supply is applied to one using the FET as the main switching element, and the oscillation circuit further includes the PNP transistor having the emitter coupled to the DC power supply and the base coupled to the other terminal of the first inductor, wherein the FET is controlled in its on/off operation by using the output outputted from the collector of the PNP transistor.

That is, in the oscillation stop state at the intermittent oscillation state, since the oscillation switching element is turned off, the PNP transistor is turned off. Thus, since no current flows into the PNP transistor in the oscillation stop state, the dissipation current of the oscillation circuit becomes small.

DETAILED DESCRIPTION OF THE PREFERRED EMBODIMENTS

The embodiment of the invention will be explained with reference to the accompanying drawings.

Figure 1:
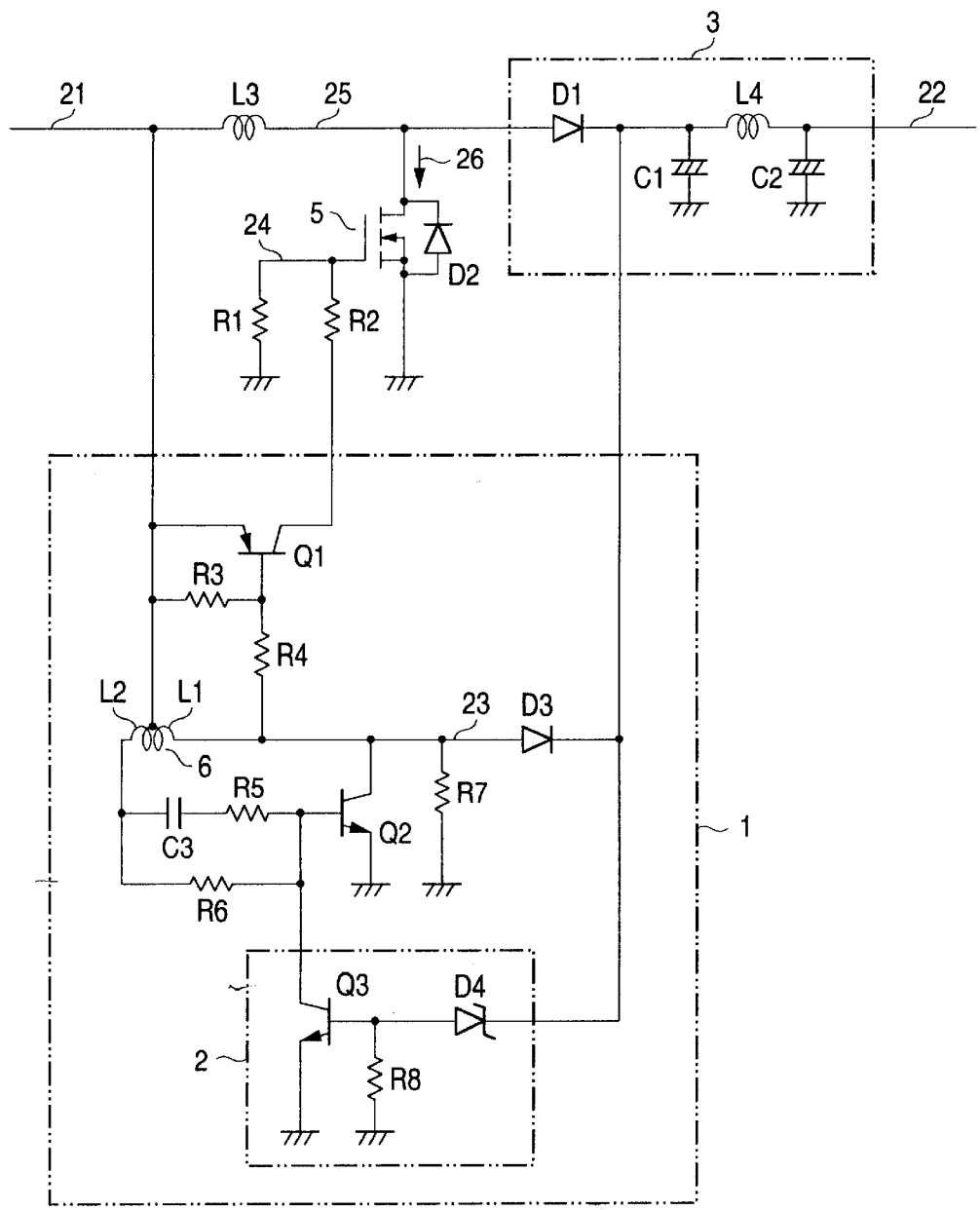
FIG. 1 is a circuit diagram showing the electrical connection of the chopper type switching power supply according to the embodiment of the invention.

FIG. 1 is a circuit diagram showing the electrical connection of the chopper type switching power supply according to the embodiment of the invention.

The chopper type switching power supply according to the embodiment is briefly provided with a main inductor L3 coupled at its one terminal to a DC power supply 21, a main switching element 5 for opening and closing the connection between the other terminal of the main inductor L3 and the ground level, a rectifying and smoothing circuit 3 for rectifying and smoothing the output generated at the other terminal of the main inductor L3 to take out the DC output 22, an oscillation circuit 1 for controlling the on/off operation of the main switching element 5, and two resistors R1 and R2.

Although the voltage of the DC power supply 21 may be an arbitrary value, the voltage is set to 10 volt in this embodiment. Further, although the voltage of the DC output 22 may be an arbitrary value in a voltage range higher than the voltage of the DC power supply 21, the voltage is set to about 27 volt in this embodiment. Furthermore, the chopper type switching power supply is arranged such that the current of about 0.6 A can be taken out at the maximum from the DC output 22.

Since the main switching element 5 is an element for opening and closing the connection, it may be formed by an NPN transistor, an FET or the like. Thus, in the embodiment, an N channel type MOSFET having a protection diode D2 therein is employed as the main switching element 5 (hereinafter, the main switching element 5 is called as an FET 5). The main inductor L3 serves as an element which sends the energy accumulated by the current flown when the FET 5 is turned on to the rectifying and smoothing circuit 3 when the FET 5 is turned off.

The rectifying and smoothing circuit 3 includes a rectifying diode D1 coupled at its anode to the other terminal of the main inductor L3, a smoothing capacitor C1 having one terminal coupled to the cathode of the diode D1 and the other terminal being grounded, an inductor L4 for eliminating a high-frequency component having one terminal coupled to the cathode of the diode D1, and a smoothing capacitor C2 having one terminal coupled to the other terminal of the inductor L4 and the other terminal being grounded. The connection point between the inductor L4 and the capacitor C2 is introduced to a not-shown load as the DC output 22.

The oscillation circuit 1 will be explained in detail.

The inductor 6 is a coil provided with a tap and arranged in a manner that a coil portion L1 from the tap to one terminal of the coil forms a first inductor recited in claim and a coil portion L2 from the tap to the other terminal of the coil forms a second inductor recited in claim. Thus, the first inductor L1 and the second inductor L2 form inductors which are inductively coupled to each other. Since the first inductor L1 and the second inductor L2 may be coils which are inductively coupled to each other, or may be formed by two coils which are wound around the same core.

The first inductor L1 and the second inductor L2 are configured in the aforesaid manner, and one terminal of the first inductor L1 is coupled to the DC power supply 21. The other terminal of the first inductor L1 is coupled to the collector of the transistor Q2 and the emitter of the transistor Q2 is grounded. That is, the transistor Q2 serves as an oscillation switching element which opens and closes the connection between the other terminal of the first inductor L1 and the ground level.

The second inductor L2 is an inductor which generates a feedback output for turning on the transistor Q2 at the time of turning on the transistor Q2. To this end, one terminal of the second inductor L2 is coupled to the DC power supply 21 and the other terminal of the second inductor L2 is coupled to the base of the transistor Q2 through a resistor R6 for limiting current. A series circuit formed by a capacitor C3 and a resistor R5 is coupled in parallel to the resistor R6. The series circuit formed by the capacitor C3 and the resistor R5 serves as a circuit for increasing the shifting speed when the transistor Q2 shifts from the ON state to the OFF state and vice versa.

A block 2 formed by a transistor Q3, a zener diode D4 and a resistor R8 serves as a voltage stabilizing circuit which detects the error voltage of the DC output 22 outputted from the rectifying and smoothing circuit 3 and, when the detected error voltage indicates the increase of the voltage of the DC output 22, reduces the level of the feedback output which is introduced to the base of the transistor Q2 from the second inductor L2 in correspondence with the increased amount of the voltage.

To this end, the cathode of the zener diode D4 is coupled to the cathode of the diode D1. The anode of the zener diode D4 is introduced to the base of the transistor Q3. The collector of the transistor Q3 is coupled to the base of the transistor Q2 and the emitter of the transistor Q3 is grounded. The resistor R8 is coupled between the base of the transistor Q3 and the ground level.

The voltage stabilizing circuit 2 is configured in the aforesaid manner. Thus, when the voltage of the DC output 22 exceeds the voltage which is the sum of the zener voltage of the zener diode D4 and the base-emitter voltage of the transistor Q3, the current corresponding to the exceeded amount of the voltage flows into the base of the transistor Q3. When the base current flows into the transistor Q3, this transistor shunts the feedback output outputted from the second inductor L2. Thus, when the transistor Q3 shunts the feedback output, the current value of the feedback output flowing into the base of the transistor Q2 decreases. The resistor R8 serves as an element for preventing the base of the transistor Q3 from being opened.

A resistor R7 for suppressing the impedance increase at the other terminal of the first inductor L1 is coupled between the other terminal of the first inductor L1 and the ground level. The other terminal of the first inductor L1 is also coupled to the anode of a clamping diode D3. The cathode of the clamping diode D3 is coupled to the cathode of the diode D1 which forms a path of the DC output 22.

As described above, the other terminal of the first inductor L1 is coupled to the clamping diode D3. Thus, the collector voltage of the transistor Q2 (hereinafter, called as the voltage of a major point 23) is suppressed in its maximum value to a value near the voltage of the DC output 22.

The DC power supply 21 is coupled to the emitter of a PNP transistor Q1 and the base of the PNP transistor Q1 is coupled to the other terminal of the first inductor L1 through a resistor R4 for limiting current. A resistor R3 is coupled between the base and the emitter of the PNP transistor Q1 in order to raise the base voltage thereof to the emitter voltage thereof when no current flows through the resistor R4. The collector of the PNP transistor Q1 is introduced to the gate of the FET 5 through the resistor R2 for limiting current. The resistor R1 for discharging the electric charge accumulated in the gate of the FET 5 is coupled between the gate of the FET and the ground level.

Figure 2:
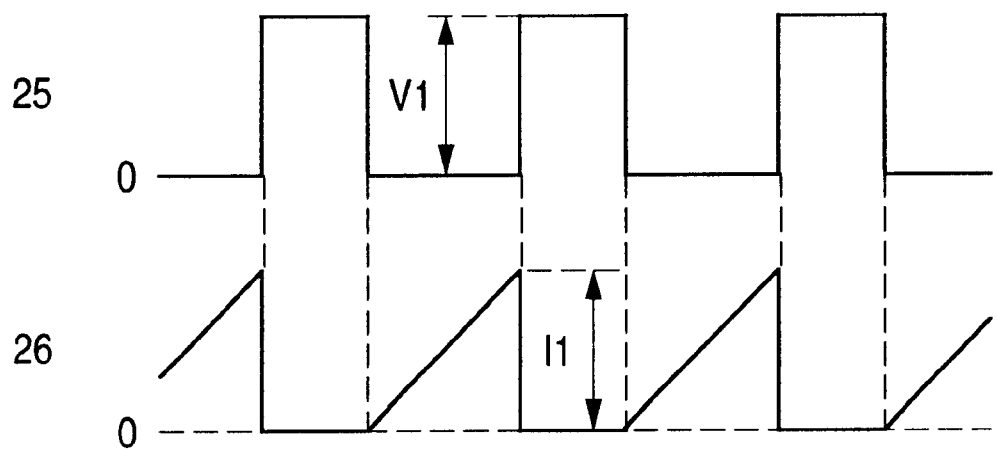
FIG. 2 is an explanatory diagram showing signal waveforms at major portions of the embodiment when the load of a DC output becomes a predetermined value.
Figure 3:
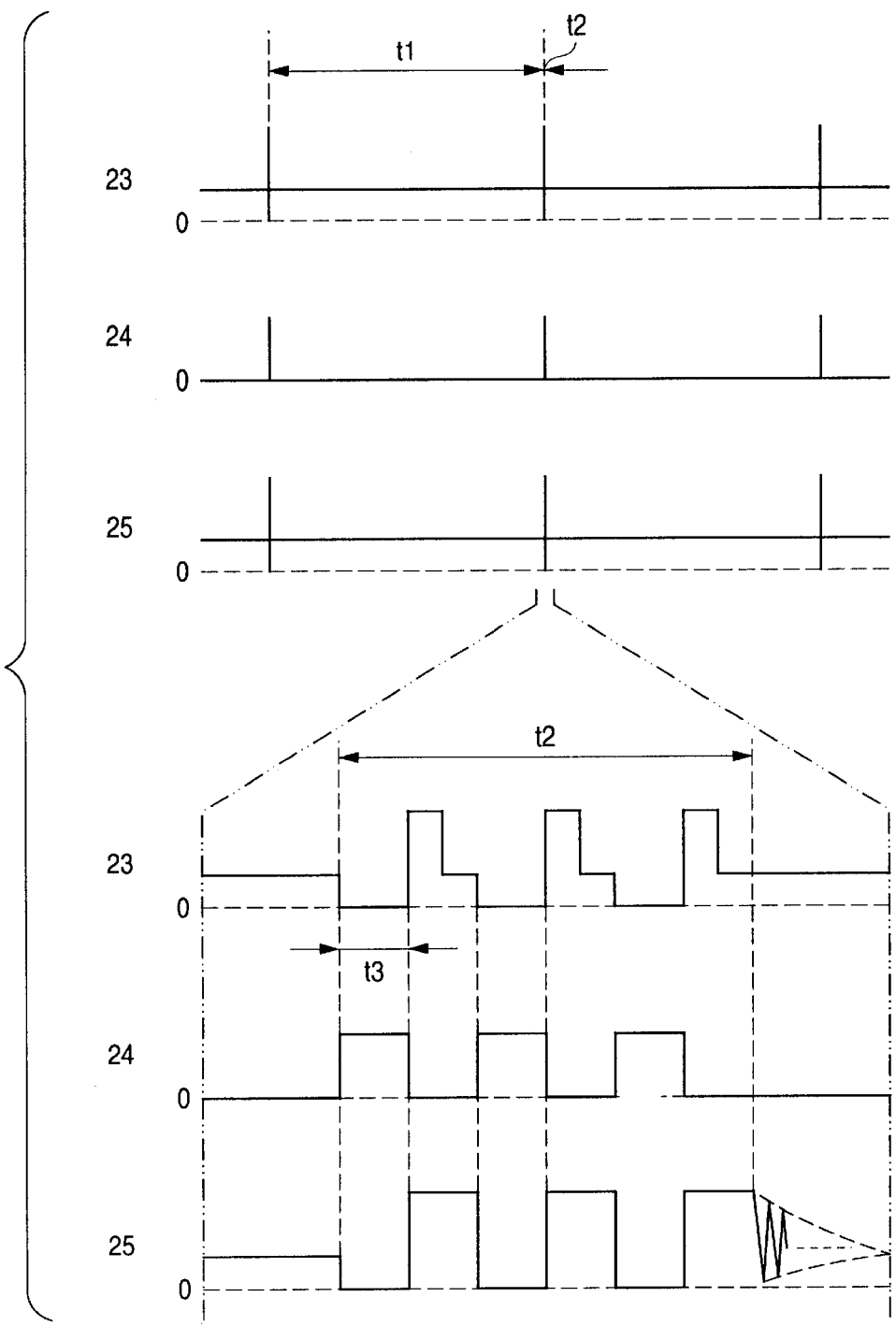
FIG. 3 is an explanatory diagram showing signal waveforms at major portions of the embodiment when the load of the DC output becomes quite small.

FIG. 2 is an explanatory diagram showing signal waveforms at major portions of the embodiment when the load of the DC output 22 becomes a predetermined value, and FIG. 3 is an explanatory diagram showing signal waveforms at major portions of the embodiment when the load of the DC output 22 becomes a quite small value. The operation of the embodiment will be explained with reference to these drawings as the need arises.

When the DC voltage is supplied to the transistor Q2 from the DC power supply 21, the transistor Q2 performs the blocking oscillation in correspondence to the feedback path formed by the first inductor L1 and the second inductor L2. That is, when the transistor Q2 shifts from an OFF state to an ON state, the voltage is generated in the second inductor L2 to the flowing direction of the base current of the transistor Q2, whereby the transistor Q2 continues an ON state. Then, when the collector current increases and reaches a value near the hfe times as large as the base current, the collector current starts decreasing. Thus, the transistor Q2 abruptly shifts to an OFF state. Then, when the energy accumulated in the first inductor L1 is discharged completely, the transistor Q2 shifts from an OFF state to an ON state. Such a sequence of operations are repeated to place the oscillation circuit in an oscillation state.

As a result of the aforesaid oscillating operation, the voltage of the other terminal of the first inductor L1 (the voltage of the major point 23) becomes about 0 volt when the transistor Q2 is turned on, whilst becomes about the voltage of the DC output 22 when the transistor Q2 is turned off. Thus, when the voltage of the major point 23 becomes about 0 volt, the PNP transistor Q1 is turned on, whilst when the voltage of the major point 23 becomes about the voltage of the DC output 22, the PNP transistor Q1 is turned off. In contrast, when the PNP transistor Q1 is turned on, the voltage for turning on the FET 5 is applied to the gate of the FET 5. When the PNP transistor Q1 is turned off, the gate voltage of the FET 5 becomes 0 volt and so the FET 5 is turned off.

As a result of the aforesaid operation, the FET 5 turns on and off in synchronous with the on/off operation of the transistor Q2. Thus, the energy accumulated in the main inductor L3 by the current flowing therein when the FET 5 is turned on is discharged when the FET 5 is turned off, so that the boosted voltage is outputted as the DC output 22. When the DC output 22 is increased to flow the current through the zener diode D4, the current flowing into the base of the transistor Q2 at the time of the turning on of the transistor Q2 reduces. As a result, the time period during which the transistor Q2 is in an ON state becomes shorter and so the time period during which the FET 5 is in an ON state becomes shorter.

As described above, in a single period of the switching operation of the FET 5, the ratio of the time period during which the FET 5 is in an ON state becomes shorter when the voltage of the DC output 22 increases, whilst becomes larger when the voltage of the DC output 22 decreases. Thus, when a predetermined amount of current flows through the load of the DC output 22, the transistor Q2 continuously repeats the on/off operation, so that the voltage of the DC output 22 is stabilized to the value near the sum of the zener voltage of the zener diode D4 and the base-emitter voltage of the transistor Q3.

A waveform 25 shown in FIG. 2 shows the change of the drain voltage of the FET 5 in the aforesaid operation state (hereinafter called as the voltage at the major point 25). The voltage at the major point 25 is near 0 volt when the FET 5 is turned on, whilst the voltage at the major point 25 is about 27 volt (shown by VI) when the FET 5 is turned off. A waveform 26 shows the change of the drain current of the FET 5 in the aforesaid operation state. The maximum value of the drain current of the FET is about 4 A (shown by I1).

When the load of the DC output 22 becomes small and finally becomes about 0, the voltage of the DC output 22 increases as compared with the voltage in the aforesaid operation state. Thus, there arises such a phenomenon that the base current of the transistor Q3 increases and all of the feedback output outputted from the second inductor L2 flows into the collector of the transistor Q3. When such a phenomenon occurs, since the transistor Q2 is turned off, the oscillating operation stops. During the period where the oscillating operation stops, the voltage of the DC output 22 decreases, and when a part of the feedback output outputted from the second inductor L2 flows into the base of the transistor Q2, the oscillating operation starts again. Then, when the voltage of the DC output 22 increases due to the oscillating operation, the oscillating operation stops again. In this manner, the intermittent oscillating operation is performed.

FIG. 3 shows the voltage changes at the major points 23 to 25 when the aforesaid intermittent oscillating operation occurs. In the figure, a period t1 is a period during which the oscillating operation is stopped and a period t2 is an oscillating period. The ratio of the oscillating period t2 with respect to the oscillation stop period t1 becomes smaller as the load approaches 0, and finally becomes 1/several hundreds when the load becomes almost 0. This means that all the electric power dissipated both in the periods t1 and t2 is generated in the period t2. In other words, the electric power boosted in the period t2 is several hundred times as large as the dissipation power of the load of the DC output 22. Thus, a time period t3 during which the transistor Q3 is in an ON state becomes a sufficient time period (several $\mu$ seconds in this embodiment).

Further, since the FET 5 is turned on when the transistor Q2 is turned on, the time period during which the FET 5 is in a saturated ON state is several $\mu$ seconds like the aforesaid manner. In contrast, the transient time period during which the FET 5 shifts from an ON state to an OFF state and vice versa is short (200 n seconds to 300 n seconds in this embodiment). Thus, the ratio of the transient time period during which the FET 5 shifts from an ON state to an OFF state and vice versa with respect to the time period during which the FET 5 is in the saturated ON state is a small value. This means that the switching loss of the FET 5 scarcely increases despite that the load is quite small. Accordingly, the conversion efficiency does not decrease even when the load is quite small.

The auxiliary explanation of the embodiment will be explained. The clamping diode D3 serves as an element which prevents the collector voltage of the transistor Q2 from exceeding the sum of the cathode voltage of the clamping diode D3 (voltage almost equal to the voltage of the DC output 22) and about 0.7 volt. Thus, the cathode of the clamping diode D3 can be coupled to the path of an arbitrary DC output (for example, a path of a DC output such as 12 volt or 24 volt generated by other power supply circuit) as long as the path is one of a DC output of the voltage higher than that of the DC power supply 21.

Further, when the maximum value of the collector voltage of the transistor Q2 is not required to be suppressed, the chopper type switching power supply maybe arranged to eliminate the clamping diode D3 (in this embodiment, when the clamping diode D3 is eliminated, the maximum value of the voltage of the major point 23 is about 50 volt).

Figure 4:
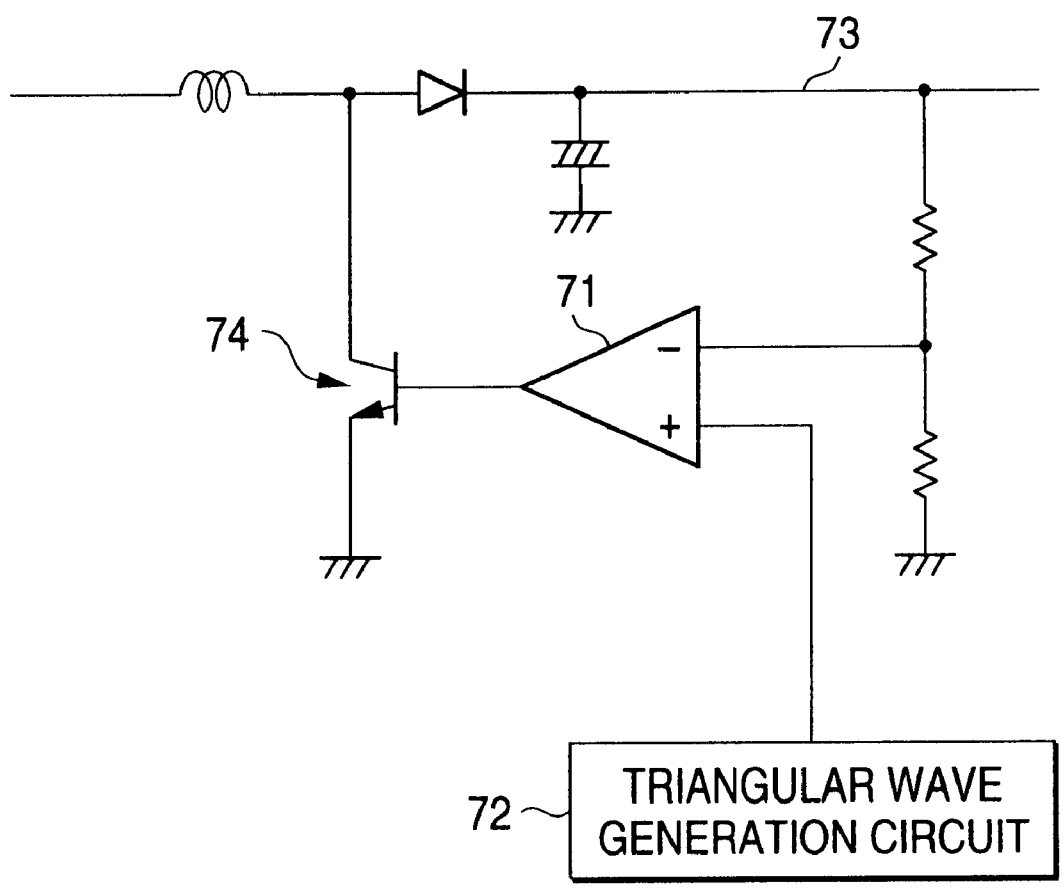
FIG. 4 is a block diagram showing the electrical arrangement of the prior art.

The comparison result between the oscillation circuit 1 and the oscillation circuit of the prior art shown in FIG. 4 (the circuit formed by the comparator 71 and the triangular wave generation circuit 72) will be explained below. That is, since the triangular wave generation circuit 72 indispensably requires a circuit for performing the charging and discharging of the capacitor with a constant current etc., the equivalent circuit thereof is complicated. Further, the comparator 71 is also complicated in the equivalent circuit arrangement thereof. In contrast, the oscillation circuit 1 of the embodiment is formed by the three transistors Q1 to Q3, the six resistors R3 to R8, the two diodes D3 and D4, the capacitor C3 and the two inductors L1 and L2. Thus, when the equivalent circuits are compared between the prior art and the embodiment, the oscillation circuit 1 of the embodiment is simplified in the circuit arrangement as compared with the prior art.

Further, in this embodiment, the DC power supply serving as the operation power supply of the oscillation circuit 1 can be one which differs from the DC power supply 21 coupled to the one terminal of the main inductor L3.

As described above, the chopper type switching power supply according to the invention is arranged in a manner that the oscillation circuit for controlling the on/off operation of the main switching element is arranged to include the first inductor coupled at its one terminal to the DC power supply; the oscillation switching element for opening and closing the connection between the ground level and the other terminal of the first inductor; the second inductor, inductively coupled to the first inductor, for generating the feedback output for turning on the oscillation switching element when the oscillation switching element is turned on; and the voltage stabilizing circuit for detecting the error voltage of the DC output outputted from the rectifying and smoothing circuit and, when the error voltage thus detected represents increase of the voltage of the DC output, for reducing a level of the feedback output induced to the oscillation switching element in correspondence to an amount of the increased voltage. Thus, when the load becomes small, the oscillation switching element oscillates intermittently, so that the value of the electric power boosted during the oscillation period of intermittent oscillation becomes large. Therefore, the ratio of the transient time period during which the main switching element shifts from an ON state to an OFF state and vice versa with respect to the time period during which the main switching element is in the saturated ON state is a small value. This means that the switching loss of the main switching element scarcely increases despite that the load becomes small. Accordingly, the reduction of the conversion efficiency can be prevented even when the load becomes small.

Further, the chopper type switching power supply is arranged to further include the clamping diode having the one terminal coupled to the other terminal of the first inductor and the other terminal coupled to the current path of an arbitrary DC output, wherein the clamping diode is arranged to such a direction that the clamping diode flows current therethrough when the oscillation switching element is turned off. Thus, when the oscillation switching element is turned off, the voltage at the other terminal of the first inductor is suppressed to the voltage near the voltage of the DC output. Accordingly, it is possible to employ an element with a low withstand voltage as a switching element for oscillation.

Further, the chopper type switching power supply is applied to one using the FET as the main switching element, and the oscillation circuit further includes the PNP transistor having the emitter coupled to the DC power supply and the base coupled to the other terminal of the first inductor, wherein the FET is controlled in its on/off operation by using the output outputted from the collector of the PNP transistor. Thus, in the oscillation stop state at the intermittent oscillation state, since the oscillation switching element is turned off, the PNP transistor is turned off. Thus, since no current flows into the PNP transistor in the oscillation stop state, the dissipation current of the oscillation circuit becomes small. Accordingly, it is possible to increase the conversion efficiency at the time of the intermittent oscillation.

What is claimed is:
1. A chopper type switching power supply comprising:
a main switching element for controlling on/off operation by an output of an oscillation circuit to open and close a connection between a ground level and other terminal of a main inductor whose one terminal is coupled to a DC power supply;

a rectifying and smoothing circuit for taking out a DC output, said rectifying and smoothing circuit being coupled to said other terminal of said main inductor, wherein said oscillation circuit comprises:

a first inductor coupled at one terminal thereof to said DC power supply;

an oscillation switching element for opening and closing a connection between the ground level and other terminal of said first inductor;

a second inductor, inductively coupled to said first inductor, for generating a feedback output for turning on said oscillation switching element when said oscillation switching element is turned on; and a voltage stabilizing circuit for detecting an error voltage of a DC output outputted from said rectifying and smoothing circuit, and when the error voltage detected represents an increase of a voltage of the DC output, for reducing a level of the feedback output induced to said oscillation switching element in correspondence to an amount of the increased voltage.

2. The chopper type switching power supply according to claim 1, further comprising:

a clamping diode having one terminal coupled to said other terminal of said first inductor and other terminal coupled to a current path of an arbitrary DC output, wherein said clamping diode is arranged to such a direction that said clamping diode flows current therethrough when said oscillation switching element is turned off.

3. The chopper type switching power supply according to claim 1, wherein said main switching element is an FET, said oscillation circuit further comprises:

a PNP transistor having an emitter coupled to a DC power supply and a base coupled to said other terminal of said first inductor, and said FET is controlled in on/off operation by using an output outputted from said collector of said PNP transistor.

* * * * *